C. W. BECK.
BATTERY BOX.
APPLICATION FILED APR. 27, 1908.
1,052,449.
Patented Feb. 11, 1913.
2 SHEETS—SHEET 2.
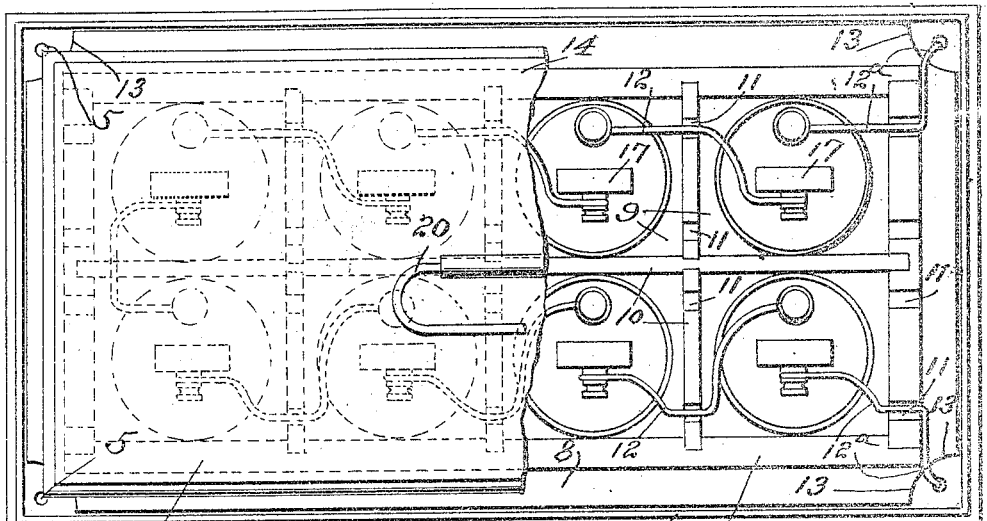
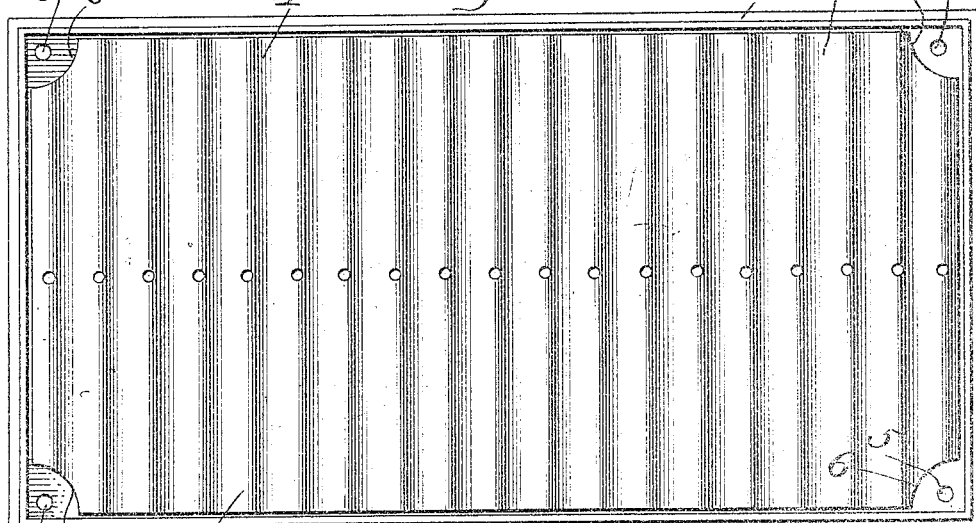
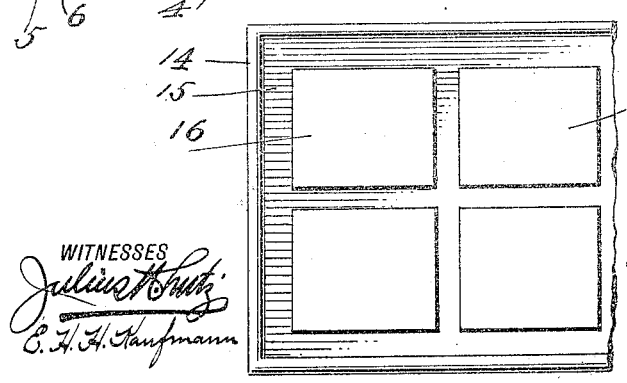
WITNESSES
INVENTOR
Chas. W. Beck
BY
Davis & Davis
his ATTORNEYS

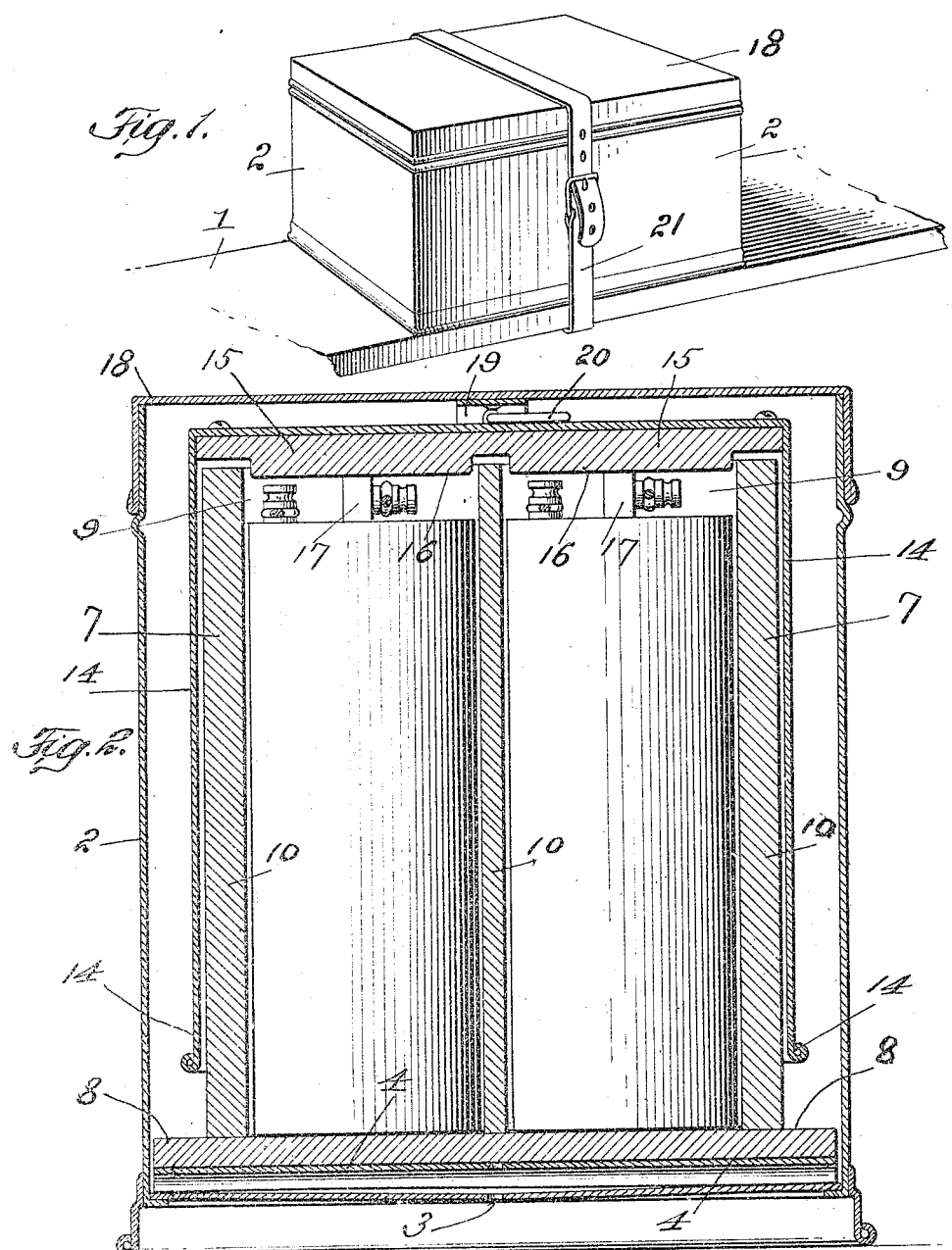

UNITED STATES PATENT OFFICE.

CHARLES W. BECK, OF ROCKVILLE CENTER, NEW YORK, ASSIGNOR, BY MESNE ASSIGNMENTS, TO MICHIGAN MOTOR SPECIALTIES COMPANY, OF DETROIT, MICHIGAN, A CORPORATION OF MICHIGAN.

BATTERY-BOX.

1,052,449.          Specification of Letters Patent.     Patented Feb. 11, 1913.

Application filed April 27, 1908. Serial No. 429,321.

*To all whom it may concern:*

Be it known that I, CHARLES W. BECK, a citizen of the United States, residing at Rockville Center, county of Nassau, State of New York, have invented certain new and useful Improvements in Battery-Boxes, of which the following is a specification, reference being had therein to the accompanying drawings, in which—

Figure 1 is a perspective view of the box secured to the foot-board of an automobile or similar vehicle; Fig. 2 a transverse vertical sectional view of the box; Fig. 3 a plan view, the outer cover being removed and the inner cover being shown as partly broken away; Fig. 4 a plan view of the main receptacle showing the corrugated false bottom; Fig. 5 a detail view of a portion of the under side of the inner cover; and Fig. 6 a detail sectional view of a portion of the outer cover showing the spring which is adapted to bear upon the inner cover.

One of the main objects of this invention is to provide a substantially moisture and dust proof casing in which to carry the dry batteries used on automobiles to provide electric current for the spark or ignition devices of the automobile engine.

It is also the object of this invention to provide such a box in which the batteries will be insulated from each other, except as they are connected by the usual conductors, and in which they will be insulated from the inclosing casing. The casing is usually of metal and it frequently occurs in battery boxes of the ordinary or usual construction that the batteries become electrically connected to the inclosing casing, thereby short-circuiting and rendering the ignition devices inoperative. In a battery box constructed in accordance with my invention this is practically impossible, thereby not only lengthening the life of the batteries, but insuring the proper operation of the electrical spark or ignition means.

Another object of my invention is to provide means for yieldingly holding the batteries within the battery box, to prevent undue vibration thereof. By thus yieldingly holding the batteries against vibration, accidental disconnection of the battery wires or connections is avoided and the batteries themselves are not liable to injury. It is well known that the inclosing casing of the ordinary dry batteries is frequently broken and seriously injured by the movement of the batteries in the battery box. In a box constructed according to my invention vertical movement of the batteries is practically avoided.

Referring to the various parts by numerals 1 designates the automobile foot-board on which the battery box is usually fastened. The box consists of an outer inclosing receptacle 2 of metal or other suitable, rigid, water-proof material. The bottom of this receptacle is slightly dished toward the longitudinal center and is provided with an opening, or a series of openings, 3, to permit of the escape of any water which might collect therein. Within this main receptacle is provided a false bottom 4 which is corrugated transversely, as shown clearly in Fig. 3. This bottom is perforated to permit any water settling thereon to drain through to the bottom of the main receptacle. The bottom of this receptacle is perforated as at 5 at the corners thereof; and the corners of the false bottom are cut away as at 6 to permit of free access to said perforations, for a purpose which will be hereinafter set forth.

Within the main receptacle, and resting on the false bottom therein, is an insulating battery holding case 7. This case consists of a wooden bottom 8 which is adapted to rest upon the false bottom 4, and a series of upright cells or compartments 9. The vertical walls 10 of the insulating case, forming the cells, are of wood and are secured to the bottom piece 8. Each cell is adapted to receive one battery, as shown clearly in Fig. 3 and each battery is insulated from the adjoining batteries by the walls of the cell containing it, as will be readily understood by reference to Figs. 2 and 3 of the drawings. The upper edges of the walls of the cells are notched as at 11 and in these notches the battery connections 12 are arranged so that said connections pass from one cell to the next without extending above the upper walls of said cells. The base of the insulating case projects beyond the side walls of the cells, as shown clearly in Fig. 2, and is substantially equal in area to the interior of the main casing or container, in order to prevent any material lateral movement of the insulating case. The connecting cables or wires 12ª are carried into the main casing through two of the openings 5 of the bottom thereof, and the false bottom is cut away as described to permit of the free entrance of these connecting cables. The bottom piece 8 of the insulating case is also cut away, as at 13, to permit of the free entrance of the battery connections.

To retain the batteries in the cells of the insulating case and to complete their insulation from the inclosing casing, I provide a very deep-sided cover 14 for said insulating case. The sides of this cover extend into close proximity to the bottom piece 8 of said inclosing casing in order to form a substantially moisture-proof closure for said case. To the inner surface of the upper wall of said cover 1 secure an insulating plate 15, preferably made of wood. This plate is formed with the depending projections 16 which correspond in outline to the form of the cells, and are adapted to extend down into said cells and to bear on the upper ends of one of the pole pieces of the batteries. As shown in the drawings these projections bear upon the upper ends of the carbon pieces 17 of the batteries. These projections are so proportioned that they will contact with the pole pieces of the batteries before the main portion of the insulating plate engages the upper edge of the insulating case, as shown clearly in Fig. 2, so that the pressure of the inner cover will be directly upon the batteries instead of being taken up by the walls of the insulating case.

The outer or main casing is provided with a cover 18 to the inner surface of which a spring 19 is secured. When the outer cover is in place the spring 19 bears on the inner cover 14 of the insulated case and yieldingly holds it in position and presses it firmly down on the carbon pieces of the batteries. The inner cover is provided with a handle 20 by which it may be readily removed.

The battery box is secured to the footboard of the automobile by a strap 21, said strap also serving to hold the cover of the outer or main receptacle in position.

It is manifest that by the construction described and shown the batteries will each be insulated from all the other batteries, except as they may be connected by the usual electrical connections; and that the insulating case will be inclosed in a practically dust and moisture-proof casing. It is also obvious that the batteries will be held against movement in their inclosing cells so that accidental disruption of the battery connections will be practically impossible. Thus two of the most frequent causes of the failure of the battery current, namely, accidental disruption of the connections and short-circuiting by reason of injury to the battery cells, or moisture collecting in the battery box, are avoided.

The insulating case is readily removable from the main casing and the false bottom loosely rests in the main casing so that it also may be readily removed. By this means the case may be readily cleaned and repaired.

Having thus described my invention, what I claim as new and desire to secure by Letters Patent, is:—

1. A battery box comprising an outer casing, an inner insulating case smaller than the interior of the outer casing and formed of a series of cells to receive the batteries, a cover for the insulating case, an insulating means secured to the inner side of said cover and adapted to extend down into the cells of the insulating case, a cover for the outer casing, and means to hold the inner cover in contact with the batteries in the cells.

2. A battery box comprising an outer casing, an inner insulating case formed with battery receiving cells, a cover for the inner case, the sides of said cover extending near to the bottom of said case, a cover for the outer casing, and a spring carried by said cover and adapted to bear upon the cover of the inner case.

3. A battery box comprising an outer casing having a perforated bottom to permit of the passage of the battery wires and for the escape of water, a corrugated metal false bottom loosely arranged in said casing, said bottom being perforated to permit of the escape of water, an insulating case within said main casing and formed of a series of battery-receiving cells, the false bottom and the bottom of said insulating case being recessed to permit of the passage of the battery wires, a cover for the inner case, insulation secured to the inner side of the said cover and adapted to extend over the top of the insulating case and down into the cells thereof, the ends of said cover extending down near to the bottom of said case, a cover for the outer casing, and a spring carried by the outer cover and adapted to bear down on the inner cover to yieldingly hold it in place against the batteries within the cells.

4. A battery box comprising an outer casing, an inner insulating case formed with battery-receiving cells, a cover for the inner case, the sides of said cover extending near to the bottom of said case, a cover for the outer casing, and means carried by the outer cover and adapted to bear upon the cover of the inner case to hold it in position.

5. A battery box comprising an outer casing, an inner insulating case formed with battery-receiving cells, a cover for the inner one, the sides of said cover extending near to the bottom of said case, insulating material secured to the inner side of said cover and extending down into the cells of the insulating case, a cover for the outer casing and a resilient means carried by the outer cover and adapted to bear upon the inner cover.

6. A battery box comprising an outer casing, an inner insulating case to receive the battery cells, a cover for the inner case provided with insulating material on its inner side, the sides of said cover extending near to the bottom of said case and on the outer side thereof, and a cover for the outer casing.

7. A battery box comprising an outer casing, an inner insulating case to receive the battery cells, means within said case to insulate the batteries from each other, a cover for said inner case, insulating material secured to the inner side of said cover and adapted to hold the battery in position, an outer cover, means between the two covers to hold the inner cover yieldingly in position, and means for holding the outer cover in position on the outer casing.

In testimony whereof I hereunto affix my signature in the presence of two witnesses this 24th day of April, 1908.

CHARLES W. BECK.

Witnesses:
 W. W. BOWMAN,
 O. J. RIDENOUR.